June 7, 1932. H. W. HELMS 1,862,115
AUTOMATIC COUPLING MECHANISM FOR SEMITRAILERS
Filed May 31, 1930 5 Sheets-Sheet 3

June 7, 1932.  H. W. HELMS  1,862,115
AUTOMATIC COUPLING MECHANISM FOR SEMITRAILERS
Filed May 31, 1930   5 Sheets-Sheet 4

Inventor.
Harry W. Helms.
by
his Attorneys.

June 7, 1932.  H. W. HELMS  1,862,115

AUTOMATIC COUPLING MECHANISM FOR SEMITRAILERS

Filed May 31, 1930  5 Sheets-Sheet 5

Inventor.
Harry W. Helms.
by his Attorneys.

Witness

Patented June 7, 1932

1,862,115

UNITED STATES PATENT OFFICE

HARRY W. HELMS, OF DETROIT, MICHIGAN, ASSIGNOR TO HIGHWAY TRAILER COMPANY, OF EDGERTON, WISCONSIN, A CORPORATION OF WISCONSIN

AUTOMATIC COUPLING MECHANISM FOR SEMITRAILERS

Application filed May 31, 1930. Serial No. 457,779.

This invention relates to a combined vehicle unit comprising a tractor and a semi-trailer adapted to be coupled together for conjoint operation; and more particularly the present invention relates to semi-trailers of the type having load supporting means arranged for temporarily supporting the forward end of the trailer when it is disconnected from the tractor; and adapted to be automatically raised out of operative position by the relative movement of the vehicle units during the coupling operation.

The main object of the present invention resides in the provision of means that is substantially automatic for effecting positive and speedy coupling and uncoupling of the vehicle units in response to their relative movements during these respective operations. Another object is to provide safety check means for positively precluding raising of the temporary support of the trailer during coupling operation until it is assured that the tractor and trailer units are positively locked together in coupling relation. Other objects and advantages will be apparent as the description proceeds, taken in connection with the accompanying drawings, in which:—

The present invention represents certain refinements and improvements in construction and operation in combined trailer units of the type disclosed in my co-pending Patents Nos. 1,783,087 issued November 25, 1930, and 1,785,697 issued December 6, 1930.

Combined vehicles of this character are preferably made detachable to speed up and effect economy in handling merchandise, since one tractor vehicle ordinarily is capable of use in hauling a number of trailers alternately from place to place; one or more of the trailers remaining at the loading point during the interval when a loaded trailer is being transported. Hence it is essential that the tractor and trailer units be constructed and arranged so that the coupling and uncoupling operations may be effected substantially automatically and positively with the utmost degree of safety to insure against injury to attendants or to the vehicle and its merchandise.

Figure 2:
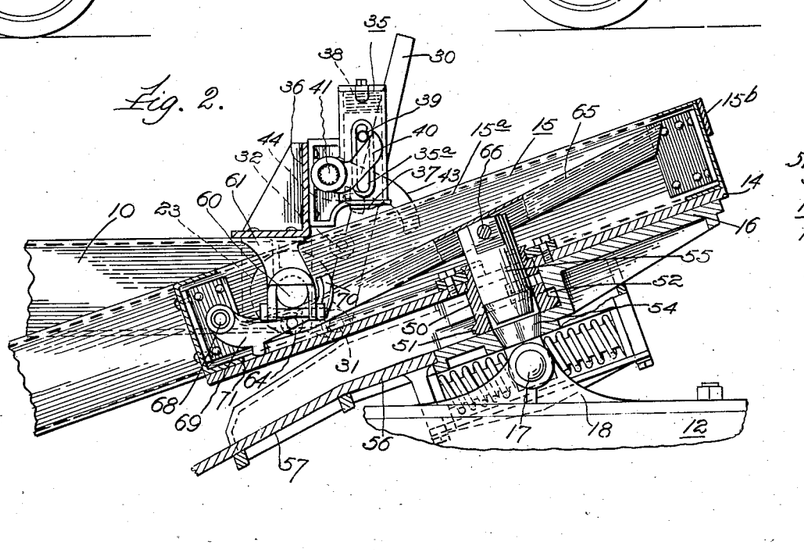
Figure 2 is a fragmentary enlarged longitudinal sectional view, with different portions of the section taken in staggered relation, showing the tractor and trailer fifth wheel members in proper registration ready for completing the coupling action.

Referring now in detail to the drawings, the semi-trailer is shown provided with a main frame, 10, having supporting wheels, 11, at the rear end thereof, and the tractor which is shown fragmentarily and diagrammatically is provided with a chassis frame, 12, partially supported on the rear wheels indicated at 13. To permit articulation of the tractor and trailer units in use for turning one vehicle with respect to the other when they are coupled there is herein shown a connection which comprises an upper fifth wheel member, 14,—which is rigidly secured to the under side or bottom of a rectangular auxiliary frame, 15, which is slidably supported by and adapted to be telescoped into and out of the forward end of the main frame, 10, into coupling and uncoupling positions respectively,—and a co-operating lower fifth wheel member, 16, mounted for tilting fore-and-aft about a transverse horizontally disposed shaft, 17, journaled in bearings, 18, on the rear end of the tractor chassis, 12. It may be understood that this lower fifth wheel member is so designed that it normally tends to assume a definite rearwardly tilted position substantially as shown in Figure 2 of the drawings.

Rigidly secured to the rear end of the auxiliary frame, 15, are a pair of transversely spaced supporting legs, 20, at the lower ends of which are journaled ground engaging wheels, 21, adapted to be automatically raised and lowered in response to the telescopic movement of the auxiliary frame and the main frame during coupling and uncoupling operations respectively. For simplicity and economy the auxiliary frame is preferably made up of structural members, and as herein shown includes a pair of side members in the nature of structural channels, 15$^a$, arranged with their flanges outturned so as to provide longitudinal guide tracks for engaging the rollers, 23, disposed at opposite sides of the auxiliary frame and mounted adjacent the forward end of the main frame by means of which the auxiliary frame is supported throughout its range of telescopic movement. These rollers are preferably journaled on studs, 24, which in turn are rigidly secured in brackets, 25, firmly secured to the front end of the trailer main frame, 10. It will be apparent that this arrangement of the supporting rollers is such as to afford substantially free and unhindered telescopic movement of the auxiliary frame. The auxiliary frame when extended forwardly of the trailer main frame is adapted to assume an upwardly inclined position, as seen in Figure 2, by virtue of its rear end being caused to travel downwardly under control of rollers, 27, journaled on the rear end of the auxiliary frame, for travel in downwardly inclined guide tracks, 28, which are rigidly secured to the trailer main frame at opposite sides of the auxiliary frame. Thus as the auxiliary frame is moved forwardly with respect to the trailer its path of movement is positively controlled by the rollers, 27, traversing the guide tracks, 28, while the rollers, 23, at the forward end of the main frame serve to provide a pivot or shifting fulcrum about which said auxiliary frame tilts to an upwardly inclined position. It is to be understood that when the auxiliary frame has moved to said forwardly inclined position, the ground-engaging wheels, 21, have been simultaneously and positively lowered into operative position for temporarily supporting the front end of the trailer. The lower end of the guide track, 28, is so formed as to provide a stop surface, 28$^a$, for the rollers, 27, for positively limiting the extension of the auxiliary frame with respect to the trailer frame.

Figure 1:
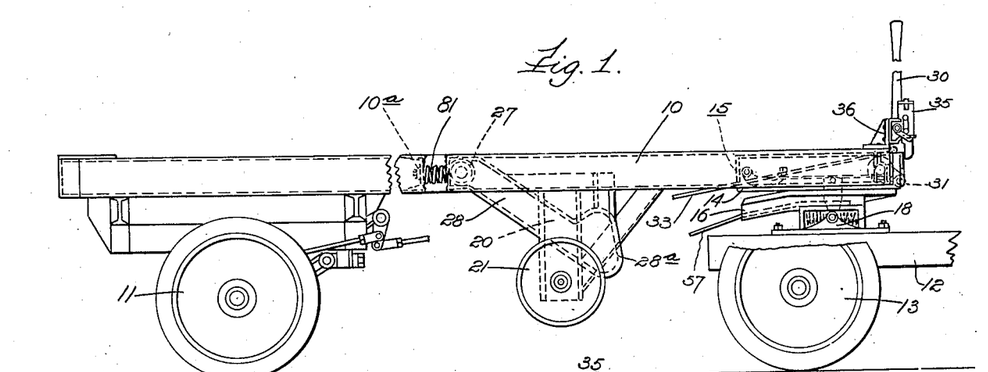
Figure 1 is a side elevation of a combined vehicle unit embodying the present invention; with the forward end of the tractor broken away, showing the rear end thereof in supporting relation under the front end of the trailer.

It is to be understood that while the trailer is uncoupled from the tractor the brakes of the trailer preferably remain set, but are automatically released upon completion of the coupling operation as shown and described in detail in my co-pending Patent No. 1,783,087 issued November 25, 1930. Preparatory to uncoupling of the vehicle units the trailer brakes are applied, and to insure safety I prefer to set the brakes manually. For this purpose I provide a convenient hand lever, 30, pivoted at 31 to the front end of the trailer main frame and pivotally connected at 32 to an operating rod, 33. It may be understood that the arrangement of the brake linkage is such that when the brakes are released the lever, 30, is normally disposed in substantially vertical relation as seen in Figure 1 and when the brakes are in applied position the lever, 30, is moved to a forwardly inclined position as seen in Fig. 2.

Figures 5, 6:
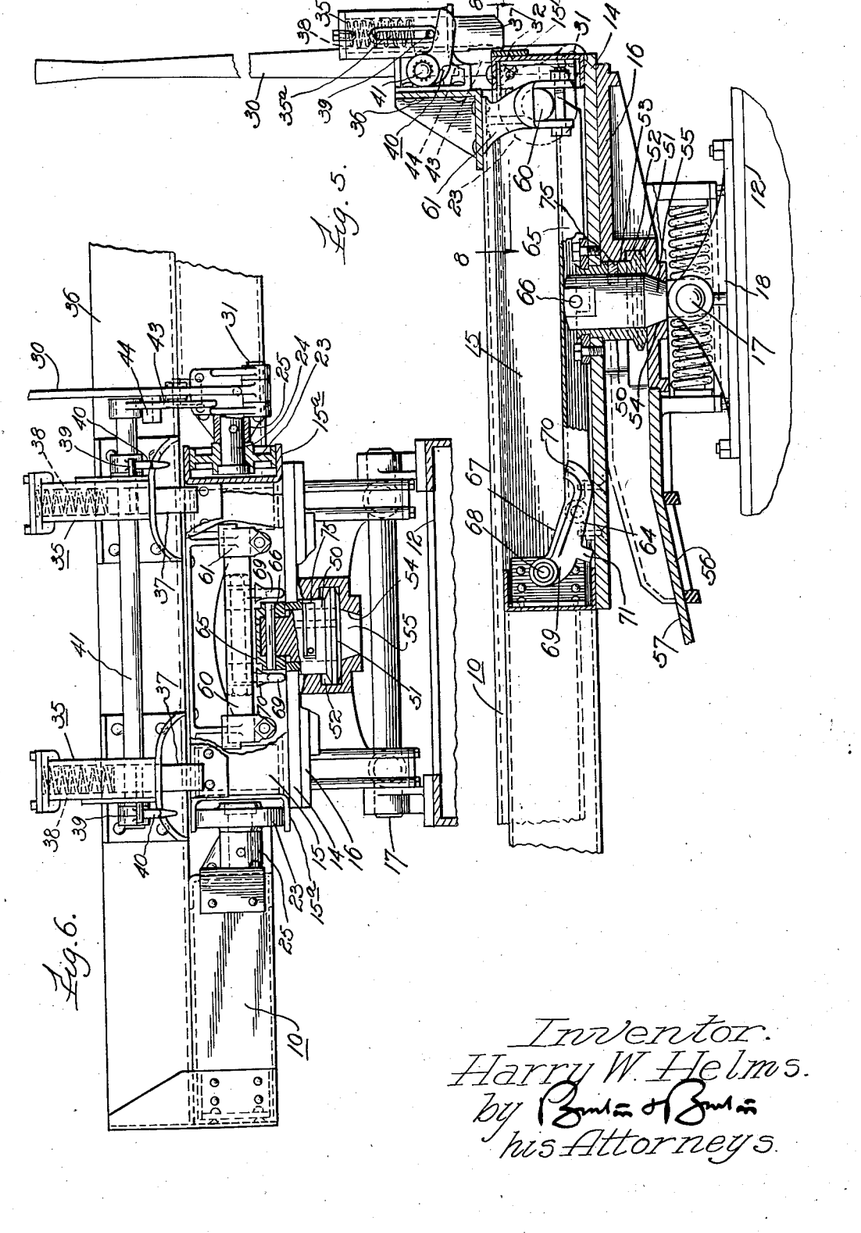
Figure 5 is a fragmentary longitudinal sectional view showing the tractor and trailer coupled together, with the auxiliary frame telescoped into the trailer main frame.
Figure 6 is a front end view of the trailer with the tractor coupled thereto, with portions broken away and in section to show details of construction.
Figure 7:
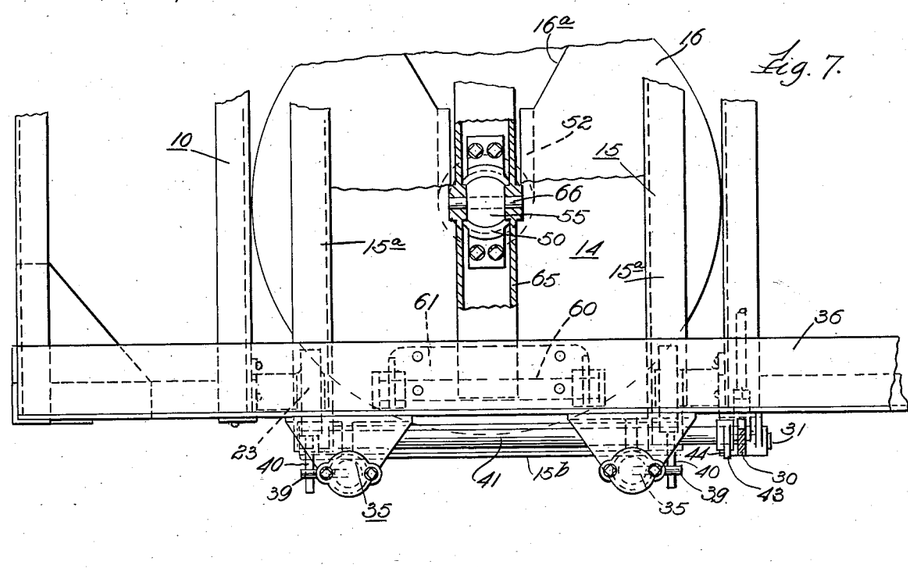
Figure 7 is a fragmentary plan view of the front end of the trailer showing the auxiliary frame telescoped in the main frame and with parts broken away and shown in section to illustrate details of construction.
Figure 8:
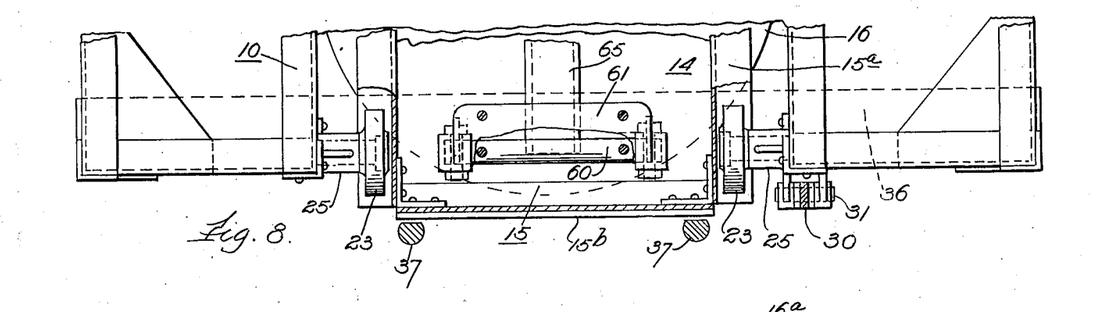
Figure 8 is a view similar to Figure 7 with parts in section taken just below the upper edge of the auxiliary frame, as indicated at line 8—8 on Figure 5.

When the auxiliary frame is telescoped into the main frame it is locked therein by a pair of transversely spaced latching devices, 35, secured to the upright face of a framing member, 36, which extends across the front end of the trailer main frame. These latch devices each include a vertically movable dog, 37, normally urged downward by a spring, 38, so as to project forwardly of and substantially engage the wear strip, 15$^b$, extending across the forward end of the auxiliary frame. These dogs are each provided with a laterally extending pin, 39, projecting through a slot, 35$^a$, in the latch housing in position to be engaged by fingers, 40, rigidly secured on a rock shaft, 41, journaled in said latching devices. Mounted on the end of this rock shaft, 41, adjacent the hand lever, 30, is a cam finger, 43, whose under side is provided with a cam surface, normally disposed in vertical position as seen in Figure 5, when the auxiliary frame is locked in the main frame. Said cam surface is adapted to be engaged by a laterally offset camming projection, 44, on said brake lever, 30, so that when said hand lever is swung forwardly the projection, 44, acts camwise on said finger, swinging it in an upward direction, thereby turning the shaft, 41, so that the fingers, 40, by their engagement with the pins, 39, will raise the latch dogs, 37, releasing the auxiliary frame to permit the latter to be drawn outwardly from the end of the trailer main frame. It may be understood that when the brake operating lever, 30, is swung forwardly into position for setting the brakes, it will be held in such position by any suitable detent device (not shown) associated with the brake linkage, and the locking dogs will be held clear of the auxiliary frame by the camming projection, 44, engaging the cam finger, 43, in a manner to prevent any pressure exerted through the finger, 38, of the latch devices tending to swing the brake operating lever to upright position and release the locking dogs.

A sleeve, 50, is rigidly secured to and projects downwardly from the under side of the upper fifth wheel member, 14, and is formed at its lower edge with a flange, 51, adapted to engage in an undercut groove, 52, formed in the closed end of a rearwardly open V-shaped slot, 16ᵃ, formed in the lower fifth wheel member, 16. This V-shaped slot terminates in a semi-circular bearing, 53, which receives the sleeve, 50, and insures centering of the fifth wheel members of the two vehicle units when the tractor is backed toward the trailer in coupling operation. The bottom surface of the part, 16, at a point concentric with the semi-circular bearing, 53, is provided with a tapered aperture, 54, with which co-operates the tapered end of an axially movable king pin, 55, which is telescopically carried in said sleeve, 50. The lower fifth wheel member, 16, is preferably a cast member and is provided with a seat for a plate, 56, which is formed with a rearwardly inclined portion, 57, as seen in Figure 1, so as to facilitate guiding the sleeve into the V slot during the coupling operation of the vehicle units; thus, the sleeve, 50, when it engages the inclined portion, 57, of the lower fifth wheel member will be directed to the semi-circular bearing, 53, in the majority of cases, and even when the tractor and trailer units are slightly misaligned vertically so that the forward end of the trailer is supported a little lower than normally with respect to the lower fifth wheel of the tractor. The flange, 51, of the sleeve when engaged in the undercut groove, 52, will preclude vertical separation of the fifth wheel members of the respective vehicle units, and when the king pin, 55, is projected downwardly from the sleeve so as to engage in the tapered seat, 54, in the lower fifth wheel member, by means which will hereinafter be described, the fifth wheel members will be locked against horizontal separation.

Carried at the front end of the main frame and disposed wholly within the auxiliary frame, is a horizontal cross shaft, 60, supported at its ends in a bracket, 61, which in turn is secured to the under side of the angle member, 36, which extends across the front of the main frame. Pivotally mounted on the upper surface of the upper fifth wheel member, within the auxiliary frame in a bearing bracket, 64, is a centrally located longitudinally extending operating lever, 65, of inverted U-shaped cross section. This lever extends a substantial portion of the length of the auxiliary frame with its forwardmost end engaging beneath the cross shaft, 60, as may be seen in Figure 5 of the drawings. Pivoted approximately midway of the length of said lever, at 66, is the king pin, 55, which is axially movable in its rigid sleeve, 50, under the control of said lever. The lever has a portion extending rearwardly beyond its fulcrum inclining upwardly to provide a cam surface, 67, and to the extreme rear end of said portion there are pivotally connected at 68, a pair of locking members, 69, which are formed with hooked ends, 70, normally disposed below the upper surface of the lever, 65. These hooked ends are rockable upwardly about the pivot, 68, by virtue of projections, 71, on the under sides of said locking members which rest upon the upper surface of the upper fifth wheel member, 15, so that as the forward end of said lever, 65, is swung upwardly about its fulcrum. These projections, 71, serve as fulcrums for the locking members causing their hook portions, 70, to swing upwardly above the surface of the operating lever, as may be seen in Figure 2 of the drawings. It will be apparent that substantially the entire upper surface of the operating lever, 65, is in effect a camming surface which is slidably engaged by the under surface of the cross shaft, 60, and that when the auxiliary frame is drawn out forwardly with the lever sliding under the shaft, 60, the king pin will remain extended in its sleeve until the inclined cam surface, 67, is engaged by said shaft, which will then cause swinging of said lever upwardly about its fulcrum. This movement will withdraw the king pin into the sleeve, and simultaneously cause rocking of the locking members so that their hook portions, 70, will be projected up above the lever, directly in front of the shaft, 60. Thus return movement of the auxiliary frame into the main frame is normally prevented by reason of the hooks, 70, engaging said transverse shaft, 60.

In coupling the tractor and trailer, the tractor is backed toward the trailer, and by virtue of the fact that both fifth wheel members are co-operatively tilted the fifth wheels are quickly brought into registration with the sleeve, 50, following the V-groove to the swivel bearing, 53, of the lower fifth wheel; and as may be seen in Figure 2, when the auxiliary frame has been shifted slightly rearwardly so that the inclined cam surface, 67, of the lever has been freed from control of the shaft, 60, and the operating lever is ready to swing downwardly about its fulcrum, and drop the king pin, 55, through the sleeve, into its seat, 54, in the lower fifth wheel member. As the auxiliary frame continues rearward movement from the position shown in Figure 2, the shaft, 60, acting camwise against the forward part of the operating lever, tends to force it downwardly, for moving the king pin into locking position. However, unless the seat, 54, is aligned with the king pin such action is prevented, and the rearward movement of the auxiliary frame is checked by the hooks, 70, engaging the shaft, 60. When the king pin is registered with its seat, the cam action of the shaft, 60, on lever, 65, will force the king pin into its seat and simultaneously lower the hooks below the shaft, 60, permitting the auxiliary frame to be telescoped into the main frame.

Figure 10:
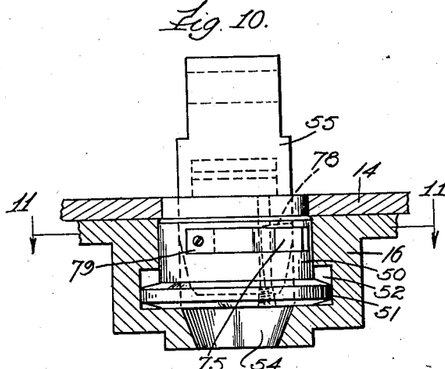
Figure 10 is an enlarged axial sectional view through the king pin, its sleeve and the swivel bearing of the fifth wheel members.
Figure 11:
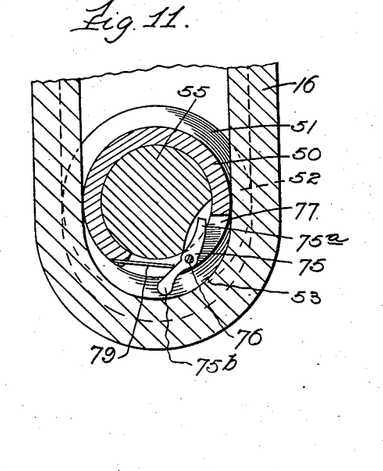
Figure 11 is an enlarged sectional view taken substantially as indicated at line, 11—11, on Figure 10, showing the automatic latch for holding the king pin telescoped in the sleeve ready for encounter with the curved swivel bearing surface of the lower fifth wheel member for releasing the king pin.
Figure 12:
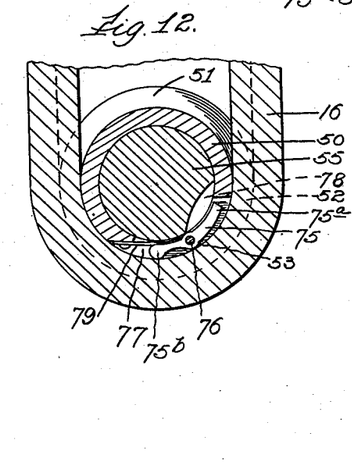
Figure 12 is a view similar to Figure 11, showing the latch in operated position and the king pin released for downward extension into the socket of the lower fifth wheel member.
Figure 13:
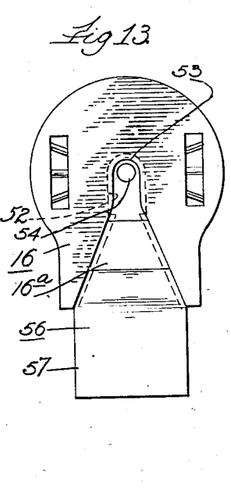
Figure 13 is a plan view of the lower fifth wheel member on the tractor.

Since the telescoping of the auxiliary frame into the main frame serves to raise the supports, 20, and wheels, 21, from trailer-supporting position to their elevated, inoperative position, it is important to insure that the tractor and trailer are properly and positively coupled before this is done. Therefore, I provide safety means which positively precludes backing of the auxiliary frame into the main frame until the fifth wheel elements of the trailer and tractor units have been securely locked together. This means comprises a latch member, 75, pivotally mounted at 76 in a slot, 77, of the king pin sleeve, 50, as seen in Fig. 11 of the drawings; said latch member is formed with a portion, 75ª, which is adapted to be projected radially inward for engaging a stop shoulder, 78, of the king pin and supporting the same in upwardly retracted position in the sleeve, as shown in Figure 10. The king pin preferably has its lower portion below said shoulder, 78, cut away to insure positiveness of engagement of the latch portion, 75ª, with said shoulder. The latch member is also provided with a tail portion, 75ᵇ, which is dimensioned so that when the latch portion, 75ª, is in operative engagement with the shoulder of the king pin, said tail portion, 75ᵇ, projects laterally beyond the outer wall of the sleeve, and said latch member is yieldingly held in such position by a flat spring, 79, secured to the sleeve and reacting against the projecting tail portion, 75ᵇ. As will be observed in the drawings, this latch member is formed and dimensioned so that when swung about its pivot it will lie substantially within the wall of the sleeve, as seen in Figure 12, and when it is swung to operative position the projection, 75ᵇ, lies within the area above the flange, 51, of said sleeve. This latch member is thus located in the forward side of the sleeve, 50, so as to be engaged only by the semi-circular bearing surface, 53, of the lower fifth wheel member above the undercut groove, 52, into which the flange, 51, is received when the parts are properly positioned for coupling.

Figures 3, 4:
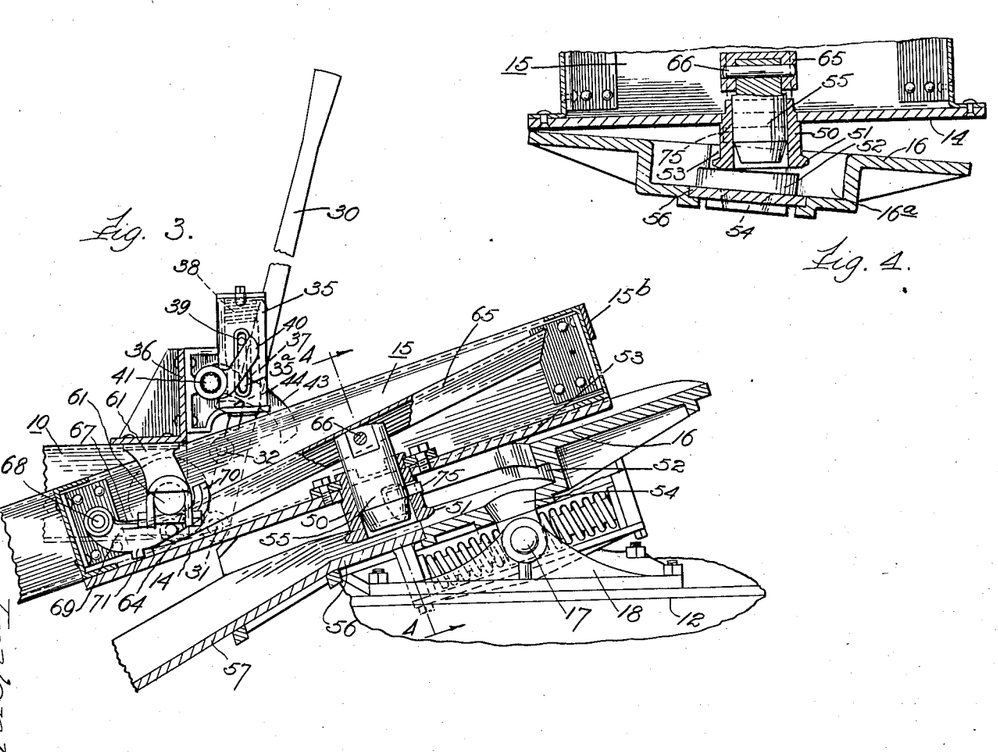
Figure 3 is a sectional view somewhat similar to Figure 2 showing a possible misalignment of the tractor and trailer; the lower fifth wheel member on the tractor being shown inclining to one side of the tractor.
Figure 4 is a transverse sectional view taken substantially as indicated at line, 4—4, on Figure 3.

It will now be apparent that by reason of the shape of this latch member, it will always retain the king pin in its upwardly retracted position until the projection, 75ᵇ, is engaged so as to swing the latch portion, 75ª, out of supporting relation with the shoulder, 78, of the king pin. However, it will be manifest that because the flange, 51, of the sleeve projects laterally beyond the tail portion, 75ᵇ, the latter cannot be engaged by any simple upright surface, but only one where there is an undercut to accommodate the flange, 51. Accordingly when the tractor is moved toward the trailer during the coupling operation the sleeve, 50, will ride up the incline of the lower fifth wheel member and be directed toward the bearing, 53, by the converging sides of the V-shaped opening thereof, and as the sleeve engages in said bearing, 53, with its flange in the undercut groove, 52, the latch tail, 75ᵇ, will be engaged by the curved bearing surface, 53, swinging said latch about its pivot, 76, so that the latch portion, 75ª, will then move free of the shoulder, 78, to release the king pin, 55. When the king pin is thus aligned with the opening, 54, and then only, is the operating lever, 65, permitted to swing downwardly by the cam action of the shaft, 60, to move the king pin to its seat; and as above mentioned, until said lever, 65, is permitted to swing downwardly, the hook portions, 70, will be disposed in a position to encounter the shaft, 60, and thereby preclude any further rearward movement of the auxiliary frame. This latching device by means of which the king pin is positively locked within the sleeve until it is aligned over its seat in the lower fifth wheel member, thus adds considerably to the safety of the vehicle. To illustrate its utility, Figures 3 and 4 show portions of the coupling elements in a possibly exaggerated relation, wherein the tractor element is assumed to be supported on irregular ground so that its fifth wheel member is canted laterally to one side. In such relation of the vehicle parts it is possible that the sleeve, 50, will ride in the V-slot of the lower fifth wheel member without even engaging the lower surface of the slot, because the fifth wheel members are supported only at a small area at one side of the center. In the event of such misalignment of the vehicle units, the latch tail, 75$^b$, will not be depressed to release the king pin, hence, the operating lever, 65, cannot swing downwardly so as to move the hook members, 69, out of locking position and thereby permit the auxiliary frame being telescoped into the main frame. It will be manifest that if telescopic movement of the auxiliary frame were permitted without coupling of the vehicle, the forward end of the trailer would be left supported only on the tractor and would be likely to slip off and pitch forward to the ground as soon as the tractor moved forward and became disengaged by reason of the incomplete coupling. But such accidents are prevented by the safety latch, 75.

Figure 9:
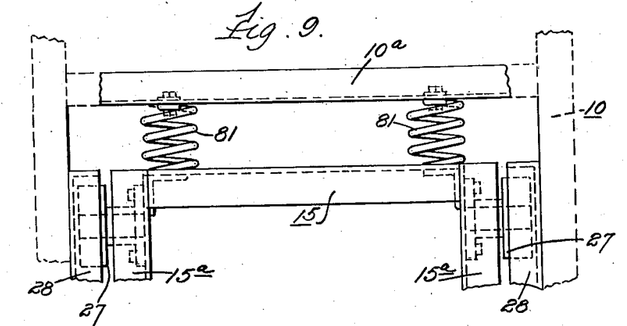
Figure 9 is a fragmentary plan view of the rear end of the auxiliary frame and the main frame showing spring means for cushioning the impact of the auxiliary frame.

To cushion the impact of the auxiliary frame when it is telescoped into the main frame of the trailer, and to relieve strain on the various elements, I preferably provide means for absorbing the shock incident to said telescopic movement, which consists of a pair of transversely spaced coil springs, 81, secured to a cross member, 10$^a$, of the vehicle main frame, with the springs arranged to encounter the rear end of the auxiliary frame, as may be seen in Figure 9 of the drawings.

The vehicle construction embodying this invention is relatively simple in design and is substantially automatic, and is positive in operation; thus insuring an unusually high degree of safety while at the same time being of rugged construction, capable of withstanding the usual rough abuse accorded such vehicles.

Although I have shown and described one particular embodiment of my invention, it will be understood that it is capable of various changes and modifications without departing from the spirit and scope thereof. I do not therefore, wish to be understood as limiting myself to the particular specific embodiment herein shown, except as indicated by the claims.

I claim:

1. In combination, a tractor, a semi-trailer having a main frame, a connection including an upper fifth wheel member carried on the trailer and a lower fifth wheel member mounted on the tractor, said lower member having a rearwardly open V-shaped slot terminating adjacent the center of said lower member in a swivel bearing having an undercut groove, and a flanged swivel member carried on the upper fifth wheel member and adapted to be guided in said V-slot into the swivel bearing with its flange portion engaged in said undercut groove for preventing vertical separation of said fifth wheel members.

2. In a combined vehicle unit comprising a tractor and a semi-trailer, a fifth wheel swivelly supporting one end of the trailer on the tractor when coupled thereto, said fifth wheel comprising a lower member carried on the tractor and an upper member supported by the trailer, said upper member being movable relative to the trailer during coupling and uncoupling operation, a king pin carried by the upper fifth wheel member and axially movable thereon, means responsive to said relative movement of the upper fifth wheel member during coupling and uncoupling operations for moving said king pin respectively in axial direction into and out of operative engagement with the lower fifth wheel member, and means adapted to engage and maintain said king pin in its latter position when the vehicle units are uncoupled.

3. In a combined vehicle unit comprising a tractor and a semi-trailer, a fifth wheel swivelly supporting one end of the trailer on the tractor when coupled thereto, said fifth wheel comprising a lower member carried on the tractor and an upper member supported by the trailer, said upper member being movable relative to the trailer during coupling and uncoupling operation, a king pin carried by the upper fifth wheel member and axially movable thereon, means responsive to said relative movement of the upper fifth wheel member during coupling and uncoupling operations for respectively moving said king pin in axial direction into or out of operative engagement with the lower fifth wheel member, and means for automatically engaging and maintaining said king pin in its latter position when the vehicle units are uncoupled, and adapted to release said king pin for permitting said first mentioned means to move it to operative position when said vehicle units are moved into coupling position.

4. In a combined vehicle unit comprising a tractor and a semi-trailer, a fifth wheel swivelly supporting one end of the trailer on the tractor when coupled thereto, said fifth wheel comprising a lower member carried on the tractor and an upper member supported by the trailer, said upper member being movable relative to the trailer during coupling and uncoupling operation, a sleeve fixedly secured to said upper fifth wheel member and adapted to be swivelly engaged in the closed end of a rearwardly open slot in the lower fifth wheel member, said sleeve having a flange adapted to engage in an under-cut groove in the swivel bearing for preventing vertical separation of the fifth wheel members, a king pin axially movable in said sleeve and adapted to be moved into engagement with the lower fifth wheel member for locking said fifth wheel members against horizontal separation, means responsive to the movement of the upper fifth wheel member for controlling the movement of said king pin, and a latch member pivoted in the sleeve, adapted to engage a shoulder on the king pin for holding the same in inoperative position when said vehicle units are uncoupled, and having a portion adapted to be extended beyond the wall of the sleeve for encountering the closed end of the slot in the lower fifth wheel member, during coupling operation, for swinging said latch out of engagement with the shoulder for permitting said means to move the king pin into operative engagement with the lower fifth wheel member.

5. In the construction defined in claim 4, spring means normally urging the latch into position for engaging the king pin.

6. In the construction defined in claim 4, said latch member being pivotally mounted in a slot of the sleeve, and being dimensioned to substantially lie within the cross sectional area of the sleeve when the king pin is released.

7. In a combined vehicle unit comprising a tractor and a semi-trailer having a main frame, an auxiliary frame carried and telescopically associated with the main frame, a two-part swivel including an upper fifth wheel member carried on the auxiliary frame, and a lower fifth wheel member carried on the tractor, said auxiliary frame being adapted for forward extension during uncoupling of the vehicle units, and adapted to be returned by backing the tractor toward the trailer during coupling operation, and spring means carried by one of the frames and engageable with the other for cushioning the impact of the auxiliary frame when the same is telescoped into the main frame.

8. In a combined vehicle unit comprising a tractor and a semi-trailer having a main frame, an auxiliary frame carried and telescopically associated with the main frame, a two-part swivel including an upper fifth wheel member carried on the auxiliary frame, and a lower fifth wheel member carried on the tractor, said auxiliary frame being adapted for forward extension during uncoupling of the vehicle units, and adapted to be returned by backing the tractor toward the trailer during coupling operation, and spring means carried on the main frame and arranged for engaging the rear end of the auxiliary frame for cushioning the impact of the same when it is telescoped into the main frame.

9. In a combined vehicle unit comprising a tractor and a semi-trailer having a main frame, an auxiliary frame carried by and telescopically associated with the main frame, a two-part swivel including an upper fifth wheel member carried on the auxiliary frame, and a lower fifth wheel member carried on the tractor, said auxiliary frame being adapted for forward extension during uncoupling of the vehicle units, and adapted to be returned by backing the tractor toward the trailer during coupling operation, means for locking the auxiliary frame in the main frame, including a vertically movable dog supported on the front end of the main frame and engageable with a stop surface on the auxiliary frame, and yieldingly urged into locking position, a transverse rock shaft carried on the main frame, a finger rigidly mounted on said shaft and arranged for engaging said dog and moving it out of operative position, an operating lever pivoted to the main frame below said shaft and normally disposed in substantially vertical position, and means responsive to forward movement of said lever adapted for turning the shaft for moving the dog out of locking position with the auxiliary frame.

10. In the construction defined in claim 9, said means including a cam finger on the rock shaft, and a cooperating part on said lever adapted to act cam-wise against said finger for rocking the shaft.

11. In a combined vehicle unit comprising a tractor and a semi-trailer having a main frame, an auxiliary frame carried by and longitudinally slidable relative to the main frame, an upper fifth wheel member carried on the auxiliary frame, and a lower fifth wheel member carried on the tractor, said auxiliary frame being adapted to be forwardly extended relative to the trailer during uncoupling of the vehicle units, and adapted to be returned by backing the tractor toward the trailer during coupling operation, means responsive to such movement of the auxiliary frame for automatically unlocking and locking said fifth wheel members together during uncoupling and coupling operations respectively; said means including a longitudinally extending operating lever fulcrumed adjacent its rear end on the auxiliary frame and having its upper surface serving as a cam, a king pin pivotally connected to said lever, a transverse cross member rigidly secured to the main frame and disposed entirely within the auxiliary frame for cooperating with the cam surface of said lever for swinging it about its fulcrum and thereby moving the king pin into or out of engagement with its seat in the lower fifth wheel member, and a hook member pivoted to the lever rearwardly of its fulcrum and adapted when said auxiliary frame is extended, to be moved upwardly and in front of the cross member by the action of said cross member on the lever and adapted to encounter the cross member and preclude return movement of the auxiliary frame unless said lever is permitted to move downwardly and project the king pin into its seat in the lower fifth wheel member.

12. In a semi-trailer, a main frame, an auxiliary frame carried by and longitudinally movable relative to the main frame, and coupling means for connecting the trailer to a tractor carried on said auxiliary frame, said frame being adapted for forward movement relative to the main frame during uncoupling of the tractor and trailer, and adapted to be returned by the backing of the tractor toward the trailer in the coupling operation; a pair of axially aligned stub shafts mounted adjacent the front end of the main frame at opposite sides of the auxiliary frame, rollers on said shafts engageable with the auxiliary frame, said auxiliary frame having side members consisting of channels arranged with outturned flanges for engaging said rollers throughout the range of movement of said auxiliary frame, together with means associated with the rear end of the auxiliary frame for controlling the movement of said frame over said rollers.

HARRY W. HELMS.